UNITED STATES PATENT OFFICE.

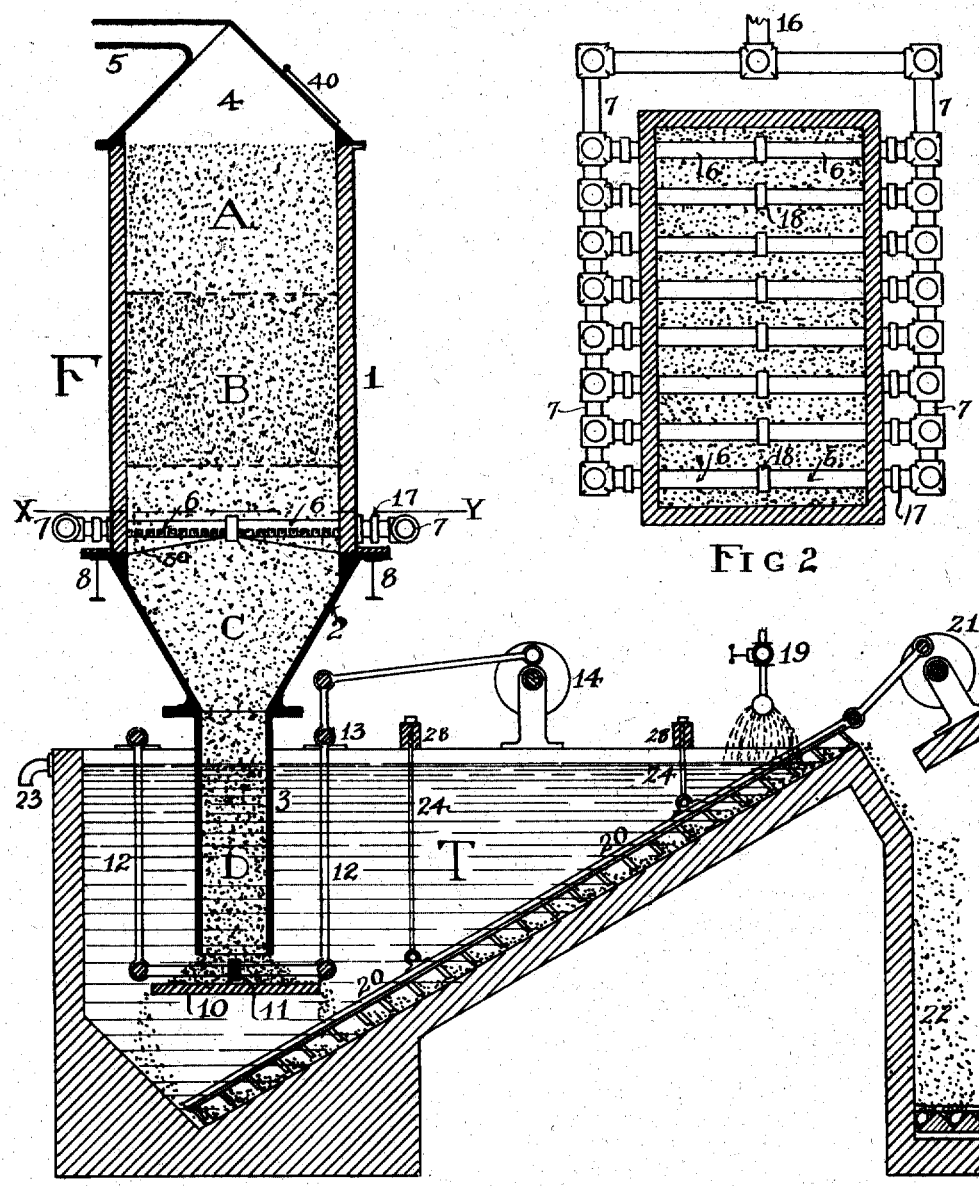

WILLIAM E. GREENAWALT, OF DENVER, COLORADO.

PROCESS OF EXTRACTING METALS FROM THEIR ORES.

1,218,996.  Specification of Letters Patent.  Patented Mar. 13, 1917.

Application filed June 1, 1915. Serial No. 31,551.

*To all whom it may concern:*

Be it known that I, WILLIAM E. GREENAWALT, a citizen of the United States, residing in the city and county of Denver and State of Colorado, have invented certain new and useful Improvements in Processes of Extracting Metals from Their Ores, of which the following is a specification.

The object of the invention is:

First; to effectually apply blast roasting to finely crushed ore in a vertical column, Second; to utilize the heat in the roasted ore to facilitate the leaching, Third; to overcome the dust losses in roasting, and the losses and discomforts in handling the roasted ore.

The invention is best described by referring to accompanying drawing in which, Figure 1 represents a section of an apparatus suitable for carrying out the process; Fig. 2 a plan on the line X—Y of Fig. 1, and Figs. 3 and 4 a detail of the twyers.

In the drawings F represents a stack roasting furnace, taken as a whole, and T a tank, filled with water or other liquid, in which the bottom of the furnace is submerged. 1 represents the body of the furnace above the twyers, 2 a hopper for the roasted ore below the twyers, and 3 an extension of the hopper submerged in the liquid in the tank T. 4 represents a hood for the collection of the gases arising from the roasting, and 5 the flue through which the gases are exhausted from the furnace. 40 is the charging door for the fresh ore.

The twyers are shown at 6, through which air or other gases is supplied to the ore in the furnace. 7 shows the pipes through which the gases are supplied to the twyers, and 16 a main connecting the twyers and supply pipes with the source of gas supply, which will usually deliver the gas under pressure. 18 represents couplings to connect the twyers within the furnace and 17 the couplings connecting the twyers to the supply pipes outside of the furnace. 8 represents I-beam supports for the furnace, and 30, supports for the twyers.

10 is a plate, a short distance below the hopper extension 3, on which the ore rests, and 11 a flight, or cross-bar, by means of which a section of the roasted ore is pushed into the liquid when the flight is reciprocated by the mechanism 14 through the arms 12, about the pivotal point 13. 19 is the supply pipe for the liquid in the tank T, and 23 the exhaust pipe for the liquid in the tank. 20 is a reciprocal conveyer, by means of which the roasted ore is withdrawn from the liquid, when actuated by the mechanism 21. 24 are flexible rods by means of which the reciprocal conveyer is suspended in the tank and in the liquid, from the beams 28. 22 is a tank into which the ore is conveyed for further treatment, or to be wasted.

The twyers are preferably constructed as shown in Figs. 3 and 4, in which 6 represents the twyer as a whole, 25 a metal pipe the lower part of which is open but having supporting bands 26. Within the metal pipe is a very porous earthenware or silica sponge pipe or lining 27 through which the air is delivered to the ore, and this porous pipe lining also prevents the fine ore from getting into the twyers and clogging the air passages and distributes the air equally through the entire ore mass.

In operating the process the hoppers C and D are filled with ore which had previously been roasted. A fire is then started on the ore, above the twyers, and the blast of air or other gases introduced into the furnace through the twyers. Fresh ore is then charged into the furnace.

In charging unroasted ore into the furnace, it is preferably mixed with carbonaceous fuel. If the sulfur content of the ore is low, carbonaceous fuel is necessary. If the ore is oxidized and sulfatizing is desired, as in the sulfating of copper ores, a mixture is preferably made containing both sulfid and carbonaceous material. If chloridization is desired, salt should also be added to the charge. The charge is intended to be roasted by the internal combustion of the combustible elements in the charge, and the temperature regulated by the amount of air introduced into the charge through the twyers.

Whatever the mixture, it is charged on top of the ignited material above the twyers so that the blast and ignited material heats and ignites the charge. Fresh ore is added from time to time until the furnace is pretty well filled and the operation well under way. The mechanism 14, which operates the flights 11 is then started, and as the flight slowly reciprocates it cuts out a complete section of the ore column and delivers it to the conveyer 20. The conveyer, in turn, agitates the liquid, and the coarse material is gradually worked to the top of the tank T and out into the tank 22, where it may be further treated, or wasted, if the soluble values are sufficiently extracted. The fine ore, or slimes, due to the agitation of the conveyer, remain in suspension in the liquid, and are withdrawn through the outlet 23, and afterward given further treatment to separate the suspended matter from the liquid, and to recover the values from the solution. The rate of out-flow of the slimes will be governed by the in-flow of liquid through the pipe 19, and this may be regulated as desired.

As the roasted ore is removed from the bottom of the column fresh ore is added on top, and thus the process goes on continuously. The fresh ore is charged through the charge-door 40. The charged ore will usually be moist so as to make it more permeable to the air blast, and may contain from five to ten per cent. moisture.

In order to better describe the process, the ore column may conveniently be divided into four zones, A, B, C, and D. A represents the unroasted ore, B the ore undergoing roasting, C the hot roasted ore, and D the ore submerged in the liquid in the tank.

Usually it will be best to keep the zone of roasting, or incandescence, a little above the twyers, so that the gases entering the furnace at the twyers zone come in contact with the hot roasted ore, so that in cooling the ore the gases are heated and thus act more economically and energetically on the ore undergoing roasting, thus serving two important economic purposes. Besides, it is desirable to have the ore comparatively cool before it enters the zone of the submerging liquid, so that the wetting will not take place with violence. This is also avoided by the slowness with which the water or liquid permeates the hot ore, and as it permeates and the ore is wetted and cooled, the steam arising therefrom, ascends and mingles with the air or other gases, introduced through the twyers, and assists in obtaining the desired results.

It is desirable that the ore should be lowered uniformly, so as to avoid channeling; this is accomplished by cutting, or removing, a complete section of the ore column by the flight 11, and as the bottom section is removed, the entire ore mass in the furnace is lowered uniformly; and as it is being lowered fresh ore is added on top. The flight 11 will usually travel quite slowly, but may be regulated to any speed desired.

The distribution of the air or other gases through the twyers is preferably made through a porous lining, reinforced by a metal support, as shown in detail in Figs. 3 and 4. The porous part of the twyer may be made of very porous earthenware or silica sponge; the idea being to get an even distribution of the air while at the same time preventing any of the fine material from getting into and clogging the twyer air passages.

It will be observed that in roasting the ore as described, the operation will be entirely dustless. No dust is produced in removing the ore from the furnace through the submerged opening in the bottom of the furnace, and no dust is produced by the air in percolating slowly upward through the roasting and fresh ore.

It will also be observed that the heat in the roasted ore is available for facilitating the solution of the metals in the liquid. Suppose, for example, the ore to be treated is a copper ore and the liquid to be an acid solution to dissolve the copper from the roasted ore; manifestly the dissolving of the copper by the acid solution will be more rapid and thorough under the action of the heat from the ore than if applied cold in a leaching vat, and this additional economy is obtained at no extra expense.

Gases other than air may be introduced into the ore through the twyers; if, for example, it is desired to sulfatize the ore by using sulfur dioxid instead of adding sulfur to the charge, this may be done by introducing the gas through the twyers with the air; in this way the air is used to burn the carbonaceous fuel in the charge to bring the ore to a roasting temperature, and the sulfur gas used to sulfatize the metals in the ore. Similarly, chlorin may be introduced through the twyers to chloridize the metal values in the ore. In any event, usually most of the metal values can be made directly soluble in water: in which case the liquid in the tank T would be water, but usually it will be a dilute acid solution, the strength of the acid being governed by the results desired and the nature of the ore.

It will be observed that the process can be made practically continuous, and this will be the normal way of operating it. The liquid seal, in addition to overcoming the dust loss and making the heat in the ore available for the dissolving of the metals, provides a feasible way of applying an air blast to a vertical column of ore, while the ore is moving in the opposite direction, and the air and steam directed upwardly through the ore instead of blowing it out downwardly through the ore already treated.

The process may also be varied to get different results; if it is desired to volatilize the metals, salt is mixed with the charge and the air blown in rapidly so as to increase the temperature to the volatilization point; if ordinary oxidizing roasting is desired an ordinary roasting temperature may be maintained; and if sulfatizing or chloridizing is desired the temperature will usually be maintained at scarcely a visible red. If sintering or agglomeration is desired, the air blast is made strong and the temperature raised to the fusing point of the material in the furnace. The gases given off from the ore may be wasted or treated as desired either for the recovery of the volatilized metals, or for the conversion of the sulfurous gases into sulfuric acid.

I claim;

1. A process of treating ores of metals which consists in disposing the ore in a vertical column having the top exposed to a gaseous atmosphere and the bottom submerged in a liquid capable of dissolving the soluble values in the ore, heating the ore, applying air or other gases to the ore to convert the metals into a soluble form, subjecting the roasted ore to the action of the liquid in which it is submerged, and withdrawing the ore from the vertical column in the submerging liquid.

2. A process of treating ores of metals which consists in disposing the ore in a vertical column having its top exposed to a gaseous atmosphere and its bottom submerged in a liquid capable of dissolving the soluble values in the ore, heating the ore, treating the ore with air or other gases to convert the metals into soluble form, cooling and moistening the ore while still in the vertical column, and then withdrawing the ore from the vertical column in the submerging liquid.

3. A process of treating ores of metals which consists in disposing the ore in a vertical column having the top exposed to a gaseous atmosphere and the bottom submerged in an acid solution capable of dissolving the soluble values in the ore, heating the ore, applying air or other gases to the ore to convert the metals into a soluble form, and withdrawing the ore from the bottom of the vertical column in the submerging liquid.

4. A process of treating ores of metals which consists in disposing the ore in a vertical column, heating the ore, applying air or other gases into the ore and roasting it by the internal combustion of its combustible elements, cooling and wetting the ore while still in the vertical column, and then withdrawing the ore from the vertical column in a submerging liquid, and continuously withdrawing the ore from the submerging liquid.

5. A process of treating ores which consists in disposing the ore in a vertical column, heating the ore, applying air or other gases to the ore and roasting it by the internal combustion of its combustible elements, cooling the roasted ore and applying to it a leaching solution, and then removing the ore from the vertical column and separately withdrawing the sands and the slimes from the leaching solution.

6. A process of treating ores which consists in disposing the ore in a vertical column, sealing the bottom of the ore column with a leaching solution, applying air or other gas to the ore and roasting it by the internal combustion of its combustible elements, continuously withdrawing the roasted ore from the ore column into the leaching solution seal, and continuously removing the leached ore from the leaching liquid.

7. A process of treating ores which consists in disposing the ore in a vertical column, heating the ore, distributing air or other gases through the heated ore through a porous material, withdrawing the ore from the bottom of the vertical column below the air inlet, and thus passing the ore in the column downwardly through the distributed air.

8. A process of treating ores which consists in disposing the ore in a vertical column, sealing the bottom of the column with a liquid seal, applying air or other gas to the ore and roasting it by the internal combustion of its combustible elements, continuously withdrawing the roasted ore from the ore column into the sealing liquid, and continuously withdrawing the ore from the sealing liquid.

9. A process of treating ores of metals which consists in heating the ore, disposing the ore in a confined vertical column with its lower extremity submerged in a leaching liquid thereby sealing the bottom of the column with a liquid seal, withdrawing the ore from the bottom of the vertical column into the submerging leaching liquid, and withdrawing the sands and slimes separately from the leaching and sealing liquid.

10. A process of treating ores of metals which consists in heating the ore, disposing the hot ore in a confined column with its lower extremity submerged in a leaching liquid thereby sealing the bottom of the column with a liquid seal, withdrawing the ore from the bottom of the column into the submerging liquid, withdrawing the sands and slimes separately from the leaching and sealing liquid, and separately treating the sands and slimes to recover the dissolved values.

WILLIAM E. GREENAWALT.

Witnesses:
FRED W. HEIDBRAK,
JAMES O. PATTERSON.